United States Patent Office 3,445,549
Patented May 20, 1969

3,445,549
METHOD FOR HEAT TREATMENT OF LYES AND SLUDGES
Bertel Kristian Hakulin, Varkaus, Finland, assignor to A. Ahlstrom Osakeyhtio, Noormarkku, Finland, a corporation of Finland
Filed June 15, 1967, Ser. No. 646,365
Claims priority, application Sweden, June 15, 1966, 8,156/66
Int. Cl. C04b 1/02
U.S. Cl. 263—53          5 Claims

ABSTRACT OF THE DISCLOSURE

A method and an apparatus for heat treatment of lime sludge or similar materials such as different lyes and sludges. Such material is fed into the rotary kiln of combined rotary and fluidized-bed kiln and is preheated whereafter it passed to the fluidized-bed kiln encountering in counter current air passed through the bottom of the fluidized-bed kiln, through the cooler and the fluidized bed and further to the rotary kiln, whereby the material is finally burned and cooled and sluiced out.

BACKGROUND OF THE INVENTION

Field of the invention

The present invention relates to a method for heat treatment of lime sludges or similar materials such as different lyes and sludges.

Description of the prior art

It is desirable to utilize the sludges and waste liquors originating from different production processes as economically as possible. The quality of the resulting product and the heat economy achieved are here of decisive importance. The by-product lime sludge, obtained at sulphate pulp mills, containing approximately 85 percent of calcium carbonate is widely regenerated to quick lime. This treatment has for long been carried out in rotary kilns which are reliable in operation and simple to operate, but the process has a high heat consumption while at the same time being slow.

It has been suggested to heat treat lime sludge in shaft kilns, which if successful, could be done with a very good heat economy. The difficulties of pelletizing the mass and of feeding it in the kiln without the weak pellets breaking have, however, so far not been possible to surmount.

It has also been suggested to treat lime sludge in kilns with fluidized beds, and this is done in a few mills in the U.S.A., but when utilizing single kilns with fluidized beds it has not been possible successfully to utilize the excess heat from the calcination zone for effective pre-heating of the material, wherefore the heat economy is poor. Further there are in operation in the U.S.A. kilns with fluidized beds, both combined as double kilns and single, provided with fluidized beds arranged in series one upon the other. This process, however, has the disadvantage that it is restricted to the use of a starting material in solid form and thus cannot be applied to the burning of sludge and lyes.

There has also been suggested a combination of a rotary kiln and a shaft kiln, operating with good heat economy. It has, however, the limitation as compared with the present invention, that the material falling down into the shaft kiln must be very well granulated. If it is not so, it is impossible to pass air through the material bed in the shaft kiln.

SUMMARY OF THE INVENTION

The object of this invention is therefore to provide a method for treating different sludges and lyes, through which all the above drawbacks are eliminated, and a burning method obtained which is applicable both for granulated and ungranulated material and which permits a good heat economy and a final product of high quality to be achieved. Further advantages are that the combination kiln requires less space than the heretofore utilized rotary kilns and that the material in the combined kilns can be treated at a lower temperature, which means a lower heat consumption and higher quality of the finished product.

According to the principal characteristics of the method according to the present invention lime sludge or similar material which is preheated in a rotary kiln is passed to a fluidized-bed kiln, connected to the rotary kiln where the material is finally treated and cooled by air passed through cooler, fluidized-bed and rotary kiln in counter current with respect to the material, whereafter the material is sluiced out.

DESCRIPTION OF THE PREFERRED EMBODIMENT

In the following a couple of embodiments of the method according to the invention are described in conjunction with the accompanying drawings, which schematically show two combinations of a rotary kiln and a fluidized-bed kiln.

Figure 1:
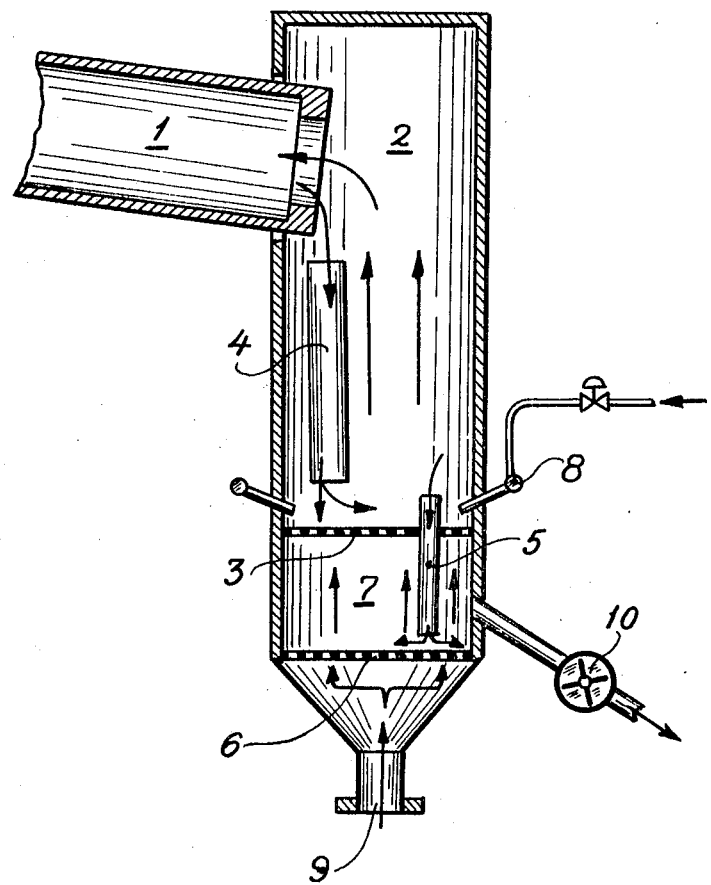
FIGURE 1 illustrates the combination of a rotary kiln and a fluidized bed kiln.

In FIG. 1 the rotary kiln is indicated at 1, and the fluidized-bed kiln at 2. The numeral 3 refers to the grate of the fluidized-bed kiln, 4 indicates a fall pipe leading the material straight from the rotary kiln down to the bed on the grate, 5 refers to a pipe leading the excess of burnt material from the fluidized bed 3 down to a grate 6 of a cooling chamber 7 below. Injection nozzles for fuel oil are indicated at 8, a connection for blowing in air is shown at 9 and an outlet sluice at 10.

The method according to the invention is carried out by means of the combined rotary and fluidized-bed kiln in feeding the material to be burned into the rotary kiln 1, which is in a conventional manner provided at its lower end with a burner for heating. In the rotary kiln the material is initially dried and then heated to the reaction temperature, which lies in the range of from 900 to 1000° C. From the rotary kiln the material falls down through the fluidized-bed kiln 2 through the fall pipe to the bed on the grate 3. The final reaction takes place here in the burning zone which is heated by fuel oil injected through the nozzles 8 immediately above the grate 3 and to which combustion air rises from the air inlet connection 9 through the grate 6 of the cooling chamber 7 and the grate 3. The material falling down from the rotary kiln meets the combustion gases ascending through grate 3 and is heated by the same. The combustion gases rise further up to the rotary kiln 1 there to contribute to the drying and pre-heating of the material.

The excess material falls through pipe 5 into cooling chamber 7 and spreads out on its grate 6. The material falling down encounters the ascending cooling and combustion air and simultaneously gives up a part of its heat to the air. On the grate 6 fresh cool air flows through the material cooling it finally, after which the excess material is sluiced out through the outlet sluice 10.

The good heat economy of the combination rotary kiln-fluidized-bed kiln is achieved by virtue of the fact that the combustion gases from the combustion zone in the fluidized-bed kiln give up their heat in counter current to the material to be treated, whereby the material is heated to reaction temperature, and this heat transfer takes place in the rotary kiln.

The above described combination kiln for carrying out the method according to the invention comprises the most simple combination, and it can, within the compass of the principle of the invention, be further developed and provided with auxiliary devices for carrying out a process with greater control possibilities as regards both the starting material and the finished product.

Figure 2:
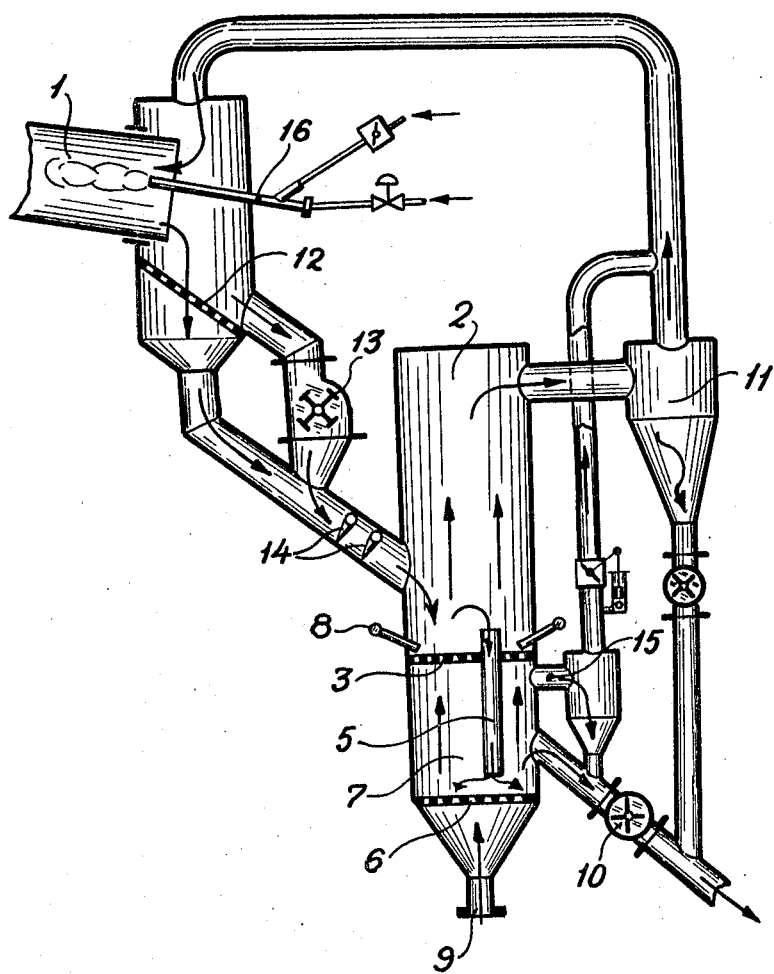
FIGURE 2 illustrates a more advanced embodiment of a similar arrangement.

The combination kiln shown in FIGURE 2 is construed for a more advanced embodiment. In FIGURE 2 the numeral 1 refers to a rotary kiln, 2 is a fluidized-bed kiln, 3 is a grate for the fluidized bed. 5 refers to a pipe leading the excess material from the fluidized bed down to the grate of a cooling space below, 6 is the said grate of the cooling chamber and 7 the cooling chamber, just as in FIGURE 1. The injection nozzles for fuel oil, the air inlet and the outlet sluice are also here designated by the same numerals 8, 9 and 10, respectively. The reference numeral 11 indicates a cyclone for separation of dust from the gases from the fluidized-bed kiln and communicating with the combustion gas inlet of the rotary kiln and with the outlet sluice 10 for the burned material from the fluidized-bed kiln. The numeral 12 designates a screen provided at the material outlet from the rotary kiln, inside the material passage leading to the fluidized-bed kiln. The material falling through the screen passes through said channel and through a sluicing device to the grate 3. The material not accepted by the screen 12 is led further through an upper material passage and through a crusher 13 to be thereby reduced to a particle size suitable for carrying out the process. After the crusher the crushed material is united with the portion accepted by the screen and is fed out together with that portion through the sluicing device 14. The cooling chamber is in its upper end provided with a connection for a duct 15 for the cooling and combustion gases, through which is led that portion of the gases which is not intended to pass through the combustion grate 3 but is passed by the fluidized bed and the combustion chamber. The duct 15 joins the duct for the remaining portion of the combustion gases after cyclone 11. Reference numeral 16 designates an auxiliary burner at the end of the rotary kiln 1. For the rest the process takes place in the same manner as in the combination kiln of FIGURE 1 and with the same good heat economy. The ungranulated or partially granulated material is fed into the upper end of the rotary kiln and is dried and preheated there to reaction temperature by the effect of the combustion gases from the fluidized-bed kiln and the auxiliary burner 16. From the rotary kiln the dried and preheated material is passed either through the screen 12 and the sluicing device 14 or over the screen 12 and through the crusher 13 to the sluicing device, which sluices the material onto the fluidized bed on the grate 3 in the fluidized-bed kiln. Here the combustion air ascending through the grate flows through the material, which then undergoes the final reaction through the effect of the burning fuel oil injected through nozzles 8. The excess material falls down through pipe 5 to the cooling chamber where it undergoes final cooling on the grate 6 through the effect of the inflowing fresh cooling air, before being sluiced out through the outlet sluice 10. The cooling and combustion air blow up through 9 moves counter current with respect to the material and receives thereby heat from the material, which undergoes burning and thereafter is cooled through the effect of this air. In order to maintain a suitable reaction balance, a portion of the cooling and combustion air is passed by the fluidized bed through duct 15 and joins the remaining portion of the combustion air after cyclone 11. The combustion air ascending through grate 3 cooperates in the combustion in the fluidized bed and ascends thereafter in the fluidized-bed kiln and is passed hence to the cyclone 11 to be there freed from dust from the combustion process. The dust separated in the cyclone falls down and unites with the material fed out through the sluicing device. The purified gases continue from the cyclone together with the gases passed by the fluidized bed through duct 15, to the rotary kiln, where they as secondary combustion gases cooperate in the drying and preheating of the starting material.

The above described combination kilns for carrying out the method of the invention constitute only two examples of such kilns and they can, of course, be combined in arbitrary manner and be otherwise varied.

Thus the method of the invention can e.g. comprise an additional process for feeding in e.g. limestone, ground to the desired particle size, to the fluidized bed, in order to obtain the desired granulation of the material.

What is claimed is:
1. The method for treating lime sludge comprising preheating said sludge while moving the same along a longitudinal path and imparting a rotating movement thereto transverse to said longitudinal path, discharging said sludge directly from said longitudinal path downwardly in a confined vertical path, heating said sludge further in a combustion zone in said vertical path by the burning of fuel in combustion air in said zone, thereafter cooling the resulting material as a fluidized bed by passing air up through said material on the way to said combustion zone, removing said material from said vertical path and passing air preheated by the heat of said combustion zone into said longitudinal path to provide the preheating of the sludge therein.

2. The method as in claim 1 and passing air preheated by the heat of said combustion zone through said combustion zone on the way to said longitudinal path.

3. The method as in claim 1 and including, by-passing air preheated by the heat of said combustion zone around said combustion zone on the way to said longitudinal path.

4. The method as in claim 1 and including, passing combustion gases from said combustion zone upward into said longitudinal path and freeing said combustion gases from dust before they enter said longitudinal path.

5. The method as in claim 1 and including, adding limestone ground to a small particle size to said fluidized bed to effect granulation of the material.

References Cited
UNITED STATES PATENTS

| 1,116,044 | 11/1914 | Ellis | 263—32 |
| 1,904,128 | 4/1933 | Fuller | 263—32 |
| 2,761,668 | 9/1956 | Sylvest | 263—32 |
| 2,833,622 | 5/1958 | Roberts et al. | |

JOHN J. CAMBY, *Primary Examiner.*

U.S. Cl. X.R.

263—32